United States Patent [19]

Pauley

[11] 4,183,265
[45] Jan. 15, 1980

[54] CONTROLLED TORQUE AIR MOTOR

[75] Inventor: Reginald W. Pauley, Belle Mead, N.J.

[73] Assignee: Ingersoll-Rand Company, Woodcliff Lake, N.J.

[21] Appl. No.: 864,740

[22] Filed: Dec. 27, 1977

Related U.S. Application Data

[63] Continuation of Ser. No. 687,329, May 17, 1976, abandoned, which is a continuation of Ser. No. 523,173, Nov. 12, 1974, abandoned.

[51] Int. Cl.² .............................................. F16H 3/44
[52] U.S. Cl. ........................................ 74/786; 74/785
[58] Field of Search .................... 74/786, 787, 785; 81/52.4 R, 52.3; 192/56 F, 56 R

[56] References Cited

U.S. PATENT DOCUMENTS

| 3,507,173 | 4/1970 | Wallace | 81/52.4 R |
|---|---|---|---|
| 3,563,113 | 2/1971 | Harvey | 74/786 |
| 3,586,115 | 6/1971 | Amtsberg et al. | 81/52.4 R X |
| 3,739,659 | 6/1973 | Workman | 81/52.4 R X |
| 3,759,334 | 9/1973 | Theurer | 81/52.3 X |
| 3,799,307 | 3/1974 | Tate | 192/56 F |

FOREIGN PATENT DOCUMENTS 315013  2/1934 Italy ............................................. 74/786

*Primary Examiner*—C. J. Husar
*Assistant Examiner*—Frank McKenzie
*Attorney, Agent, or Firm*—Walter C. Vliet

[57] ABSTRACT

A power operated wrench having a clutch means disposed to effect relative rotation between the drive means and the output spindle. The clutch means cooperates with the gear reduction system to allow the drive means to continue rotating thereby allowing repeated application of the maximum torque output of the drive means. The clutch means further effects a reduction of the system inertia which must be absorbed by a fastener after high speed run down and thereby prevents overtorque.

10 Claims, 2 Drawing Figures

CONTROLLED TORQUE AIR MOTOR

This is a continuation, of application Ser. No. 687,329 now abandoned filed May 17, 1976, which is a Continuation of Application Ser. No. 523,173, filed Nov. 12, 1974 now abandoned.

BACKGROUND OF THE INVENTION

When a conventional vane type air motor is brought to a stall, it produces an erratic torque output due to the unpredictable friction effects and random positioning of the blades. A similar effect is experienced with certain types of electric motors. When these motors are utilized as the drive means for rotating and applying a torque to a fastener the resulting torque on the fastener is unpredictable and erratic. A method of overcoming this problem has recently been developed. The method allows the motor housing to rotate slowly backwards at stall, restrained by a smooth running viscous clutch. In this manner the motor repeatedly applies its maximum output thus substantially overcoming the effect of friction and random positioning at stall.

The major objections to allowing the motor to rotate are the added costs of mounting such a motor and making air or power connections to it. A somewhat similar effect can be obtained by installing a slip clutch device between the motor and the output spindle either before or after the gear reduction normally required. If the clutch is placed in line after the gear reducer the clutch must be made large enough to carry the full output torque. In either event, the added rotating mass of the clutch creates an inertial force which must be absorbed upon stall of the fastener. In certain types of hard joints, this results in overtorquing or even failure of the fastener.

SUMMARY OF THE INVENTION

The present invention teaches a means of repeatedly applying a consistent maximum output torque on a fastener without the need for rotatively mounting the motor or increasing the inertia of the gear train. This is accomplished in the preferred embodiment of this invention by having a standard air motor drive through a sun gear and a planetary gear set to an output shaft. The ring gear of the planetary gear set is unique to gear reducers of this type in that it is supported by bearings which allow rotation of the ring gear, however, the rotation is restrained by a viscous fluid clutch. In this manner, at low torques the motor operates like a standard geared motor with the ring gear substantially restrained by the viscous fluid clutch. At high torque approaching motor stall the viscous fluid clutch permits sufficient rotation of the ring gear to prevent the motor from reaching a full stop. The slowly rotating motor rotor repeatedly applies its maximum torque output in this manner and the erratic friction and vane positioning problems at full stall are thereby avoided. The output torque fluctuates in this mode, but the peak torque is repeatable and accurate which is desirable in fastener tightening and related applications.

It is an object of this invention to provide a power operated wrench having a predictable and repeatable torque output.

It is further an object of this invention to provide a power operated wrench which is economical to manufacture and avoids the need for a rotatively mounted motor.

It is an object of this invention to teach a low cost power wrench having a pulsating, repeatable and accurate output torque and which presents low inertia to the fastener during run down.

It is a further object of this invention to teach the use of a viscous shear clutch in functional contact with the reduction gears but not rotating directly therewith to provide controlled slippage at high torque output between the power source and the output spindle.

In general, these and other objects are accomplished by a power wrench comprising:
a motor having pulsating torque output;
power conversion means to adopt said motor output to the desired output torque and speed;
means to accumulate plural revolutions of rotation within said power conversion means; and
said means to accumulate revolutions being substantially external to the direct drive train of said power conversion means so as not to materially add to the inertial content of the direct drive train.

DESCRIPTION OF THE PREFERRED EMBODIMENT

Figure 1:
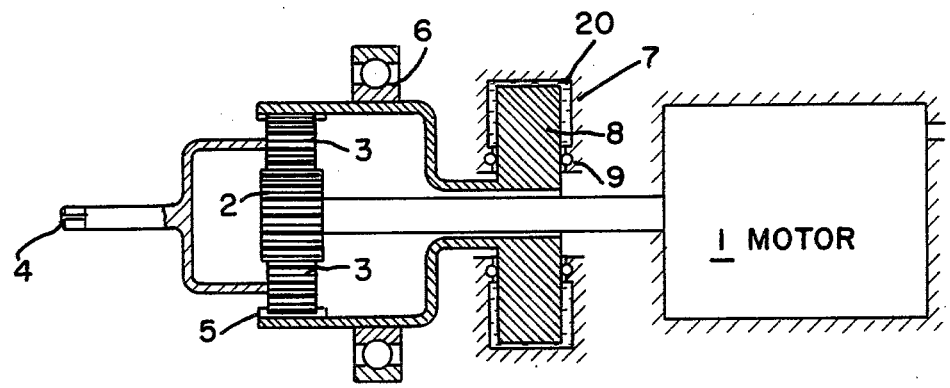
FIG. 1 is a schematic diagram of a power wrench according to this invention showing the functional parts and their cooperative relationship.

In FIG. 1, a standard air motor 1 drives through a sun gear 2 and a planetary gear set 3 including a ring gear 5 to an output shaft 4 which is connected to any suitable means such as a conventional socket (not shown) for engaging a fastener (not shown). The ring gear 5 is supported by bearings 6 and the ring gear is restrained from rotating by viscous clutch 7 having a shear disc 8 and seals 9. Except for the rotational mounting of the ring gear and the restraining of it by a viscous fluid clutch, this is a standard arrangement for a conventional power wrench. However, according to this invention, by rotationally mounting the ring gear and restraining it with a viscous clutch it should be obvious to one skilled in the art that a new and useful result is achieved. Instead of having the air motor coming to a stall condition upon halting of the fastener rotation the ring gear will rotate slowly allowing the motor to repeatedly apply its maximum torque output. It should also be obvious now to one skilled in the art that a minimum amount of rotating inertia is presented to the fastener. In fact it is believed that the inertial force presented to the fastener upon tightening is less with this system than with the conventional system without the pulsating feature because of the viscous fluid restraint of the ring gear compared to the solid restraint of the conventional system.

Figure 2:
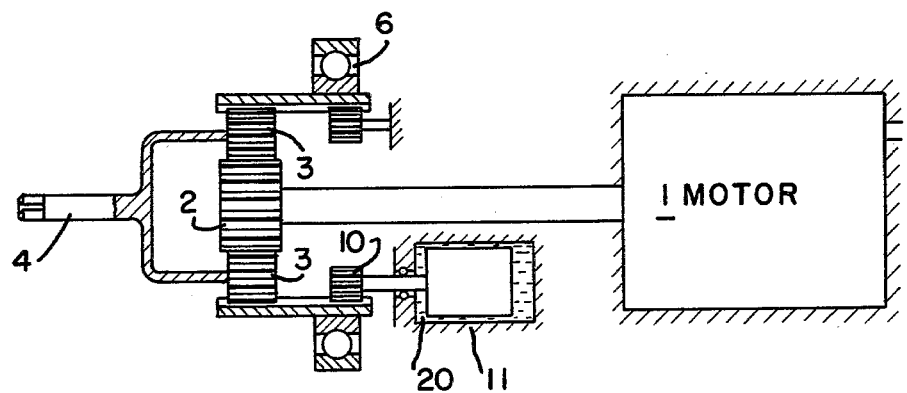
FIG. 2 is a schematic diagram of a power wrench according to a second embodiment of this invention showing the functional parts and their cooperative relationship.

The second embodiment shown in FIG. 2 is identical to the first embodiment except for the method of restraining the ring gear. In the second embodiment, the ring gear is restrained by pinion gear 10 which is in turn restrained by fluid clutch 11. It should be obvious that the pinion gear could contact the ring gear internally as shown or externally with equal results. In the second embodiment shown, the ring gear face must be wide enough to accept the pinion gear 8 and the planetary gear set 3 in passing relationship. If the pinion gear 10 were external to the ring gear, the external surface of the ring gear would be provided with appropriate engaging teeth. It is obvious that other methods of engaging contact may be utilized between the ring gear and the viscous clutch such as friction roller or belt drive.

In addition, it should be obvious to one skilled in the art that the function of the fluid clutch may be assumed by any slip clutch or coupling, or other rotation control device such as a magnetic particle clutch, a spring, a spring with geared connection or air spring device.

Numerous other gear arrangements to accomplish the instant invention will occur to one skilled in the art and applicants do not wish to be limited to the embodiments described above except as covered by the scope of the claims.

I claim:

1. A torque applying apparatus comprising:
   a motor having pulsating torque output;
   power conversion means connected to said motor for adapting said motor output to the desired output torque and rotational speed;
   an output spindle connected to said power conversion means;
   said power conversion means having active elements for transmitting torque and rotation to said output spindle and a rotatively mounted passive element forming a reaction base for said active elements;
   means for restraining the rotation of said rotatively mounted passive element in proportion to an increase in output torque within said power conversion means thereby allowing the pulsating torque output of the motor to be continuously applied after said output spindle has stalled; and
   said means for restraining the rotation being operatively connected to said passive element of said power conversion means to thereby allow said passive element to rotate at a speed proportional to torque output without addition to the inertial content of the active elements of the drive train.

2. The torque applying apparatus of claim 1 wherein: the motor is of the pneumatic type.

3. The torque applying apparatus of claim 1 wherein: the power conversion means comprises a plurality of planetary output gears, a driven sun gear and a ring gear.

4. The torque applying apparatus of claim 3 wherein: said ring gear is rotatively mounted and said ring gear is restrained.

5. The torque applying apparatus of claim 4 wherein: said restraint is supplied by a fluid clutch.

6. The torque applying apparatus of claim 5 wherein: said fluid clutch is integral with said ring gear.

7. The torque applying apparatus of claim 5 wherein: said fluid clutch is in drive contact with said ring gear.

8. The torque applying apparatus of claim 1 wherein: said means for restraining the rotation is a fluid shear clutch.

9. A power wrench comprising:
   a pneumatically operated motor;
   a sun gear driven by said motor;
   a plurality of planetary gear driven by said sun gear;
   an output spindle driven by said planetary gear;
   a ring gear engaging said planetary gear to complete a planetary gear reduction set; and
   said ring gear being rotatively mounted and allowed to rotate in operation against the restraint of a fluid clutch, said rotation being proportional to increase in torque, whereby, upon stall of said output spindle the resulting slippage in the planetary gear reduction set allows said motor to repeatedly apply its maximum output torque.

10. The power wrench of claim 9 wherein said fluid clutch including a body which is fixed against rotation and a minimum inertial element of the clutch rotates with said ring gear.

* * * * *